(12) United States Patent
Suzuka

(10) Patent No.: US 8,396,358 B2
(45) Date of Patent: Mar. 12, 2013

(54) OPTICAL DEVICE HAVING AN IMAGE-STABILIZING INSERTABLE/REMOVABLE OPTICAL ELEMENT

(75) Inventor: Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/402,065

(22) Filed: Feb. 22, 2012

(65) Prior Publication Data

US 2012/0219275 A1    Aug. 30, 2012

(30) Foreign Application Priority Data

Feb. 28, 2011 (JP) ................... 2011-042027
Jun. 2, 2011   (JP) ................... 2011-124167

(51) Int. Cl.
*G03B 17/00* (2006.01)
*G03B 5/06* (2006.01)

(52) U.S. Cl. ............. 396/55; 396/350; 348/208.11; 359/557; 359/813

(58) Field of Classification Search ............ 396/55, 396/72, 350; 348/208.11; 359/554, 557, 359/813
See application file for complete search history.

(56) References Cited

U.S. PATENT DOCUMENTS

| | | | |
|---|---|---|---|
| 7,031,603 B2 * | 4/2006 | Nomura | 396/72 |
| 7,450,833 B2 * | 11/2008 | Nomura | 396/55 |
| 7,502,552 B2 * | 3/2009 | Nomura | 396/55 |
| 7,515,182 B2 * | 4/2009 | Omiya et al. | 348/240.99 |
| 7,630,618 B2 * | 12/2009 | Nomura | 396/55 |
| 8,090,249 B2 | 1/2012 | Suzuka | |
| 8,121,467 B2 | 2/2012 | Suzuka | |
| 8,203,612 B2 * | 6/2012 | Ito et al. | 348/208.12 |
| 8,275,249 B2 * | 9/2012 | Imura et al. | 396/55 |
| 2012/0218635 A1 * | 8/2012 | Suzuka | 359/554 |

FOREIGN PATENT DOCUMENTS

JP  2007-163961  6/2007
JP  2010-217747  9/2010

OTHER PUBLICATIONS

U.S. Appl. No. 13/352,564 to Shinya Suzuka, filed Jan. 18, 2012.
U.S. Appl. No. 13/372,938 to Shinya Suzuka, filed Feb. 14, 2012.
U.S. Appl. No. 13/372,955 to Shinya Suzuka, filed Feb. 14, 2012.
U.S. Appl. No. 13/372,969 to Shinya Suzuka, filed Feb. 14, 2012.
U.S. Appl. No. 13/372,987 to Shinya Suzuka, filed Feb. 14, 2012.
U.S. Appl. No. 13/402,072 to Shinya Suzuka, filed Feb. 22, 2012.

* cited by examiner

*Primary Examiner* — Christopher Mahoney
(74) *Attorney, Agent, or Firm* — Greenblum & Bernstein P.L.C.

(57) ABSTRACT

An optical device includes an advancing/retracting member, an anti-shake frame supported by the advancing/retracting member, an insertable/removable frame which holds an image-stabilizing insertable/removable optical element and is rotatably supported by the anti-shake frame, a through-hole formed through the anti-shake frame to allow the insertable/removable frame to move between the insertion and removed positions, the through-hole including a circular arc groove about a rotational center of the insertable/removable frame and an outer end of the through-hole formed as an open end, and a bridge portion formed on the anti-shake frame to connect opposed inner walls of the through-hole at the outer end. The bridge portion is offset from the anti-shake frame and overlaps the clearance through-hole, as viewed in the optical axis direction.

8 Claims, 14 Drawing Sheets

OPTICAL DEVICE HAVING AN IMAGE-STABILIZING INSERTABLE/REMOVABLE OPTICAL ELEMENT

BACKGROUND OF THE INVENTION

1. Field of the Invention

The present invention relates to an optical device having an image-stabilizing insertable/removable optical element which can be moved to correct image shake and removed to a position outside an anti-shake driving range of the optical element.

2. Description of the Related Art

Optical devices such as cameras which are equipped with an anti-shake mechanism (image shake correcting mechanism/image stabilizing mechanism) that moves a specific optical element such as a lens element or an image sensor (image pickup device) in a plane orthogonal to an optical axis of an optical system to reduce (correct) image shake are known in the art. In Japanese Unexamined Patent Publication 2007-163961, a technique for removing (radially retracting) an image-stabilizing optical element to a position outside an anti-shake driving range (to a position off an optical axis of the optical system) when an optical device that incorporates the anti-shake mechanism moves from an operating state to a lens barrel accommodated state (fully retracted state/non-operating state) in which no pictures are taken, has been proposed for the purpose of making a lens barrel compact in size.

In the lens barrel disclosed in the aforementioned Japanese Unexamined Patent Publication, an insertable/removable frame which supports, at its free end, an image shake correcting lens group (correcting lens group/image-stabilizing insertable/removable optical element) is pivoted at a frame member (anti-shake frame) which is driven in a plane orthogonal to an optical axis to reduce image shake. The insertable/removable frame is rotated so as to make the optical axis of the image shake correcting lens group coincide with the optical axis of the other optical elements (lens groups) when the lens barrel moves from the lens barrel accommodated state to a ready-to-photograph state, and the insertable/removable frame is rotated so as to remove the image shake correcting lens group from the optical axis of the other optical elements when the lens barrel moves from a ready-to-photograph state to the lens barrel accommodated state. A clearance hole (specifically a clearance hole which includes a circular arc groove about the center of rotation of the anti-shake frame) which allows the image shake correcting lens group to move is formed in the anti-shake frame.

In optical devices having such an image-stabilizing insertable/removable optical element, it is desirable that the anti-shake frame and the elements installed thereon (specifically the insertable/removable frame and the image shake correcting lens group) be as light-weight as possible so that the anti-shake driving operation can be performed smoothly. In addition, it is desirable that the diameter and the wall thickness of the anti-shake frame be as small as possible to reduce the size (diameter) and thickness of the whole optical device. However, since the insertable/removable frame is pivotally supported by the anti-shake frame and also since the aforementioned clearance hole is formed in the anti-shake frame, if the anti-shake frame is excessively made small in diameter and thickness, the strength of the anti-shake frame becomes poor, which may deteriorate the positional accuracy of the image shake correcting lens group, especially when in a ready-to-photograph position.

SUMMARY OF THE INVENTION

The present invention has been devised in view of the above-mentioned drawbacks and provides an optical device having an image-stabilizing insertable/removable optical element which can be moved to correct image shake and removed to a position outside an anti-shake driving range of the optical element, wherein the anti-shake frame can be miniaturized without deteriorating the strength thereof to thereby achieve miniaturization of the whole optical device.

According to an aspect of the present invention, an optical device having an image-stabilizing insertable/removable optical element is provided, including an advancing/retracting member which is movable in an optical axis direction of a photographing optical system including the image-stabilizing insertable/removable optical element and includes a first orthogonal guide surface which is orthogonal to the optical axis, wherein the advancing/retracting member is moved in the optical axis direction between a ready-to-photograph position and an accommodated position, in which no pictures are taken; an anti-shake frame including a second orthogonal guide surface, which is parallel to and faces the first orthogonal guide surface, the anti-shake frame being supported by the advancing/retracting member to be movable along both the first orthogonal guide surface and the second orthogonal guide surface; an insertable/removable frame which holds the image-stabilizing insertable/removable optical element and is supported by the anti-shake frame to be rotatable between an insertion position in which the image-stabilizing insertable/removable optical element is positioned on the optical axis and a removed position in which the image-stabilizing insertable/removable optical element is removed from the optical axis; a clearance through-hole formed through the anti-shake frame so as to allow the insertable/removable frame to move between the insertion position and the removed position with at least part of the image-stabilizing insertable/removable optical element positioned in the clearance through-hole, wherein the clearance through-hole includes a circular arc groove about a rotational center of the insertable/removable frame and wherein an outer end of the clearance through-hole is formed as an open end; and a bridge portion formed on the anti-shake frame to connect opposed inner walls of the clearance through-hole, wherein the bridge portion is offset toward the opposite side of the anti-shake frame relative to the second orthogonal guide surface and overlaps the clearance through-hole, as viewed in the optical axis direction.

When the insertable/removable frame is in the removed position, it is desirable for the image-stabilizing insertable/removable optical element to be partly positioned outside of the outer end of the clearance through-hole and overlap the bridge portion, as viewed in the optical axis direction.

It is desirable for the optical device to include a pair of magnets and a pair of coils which drive the anti-shake frame to perform an image-stabilizing operation and to be supported by the anti-shake frame and the advancing/retracting member, respectively. The anti-shake frame includes a pair of magnet holding portions which support and hold the pair of magnets, respectively; and a rotational shaft which supports the insertable/removable frame in a manner to allow the insertable/removable frame to rotate about the rotational shaft. The pair of magnet holding portions and the rotational shaft project on the same side of the anti-shake frame as the bridge portion.

It is desirable for the bridge portion and the pair of magnet holding portions are arranged so that a first line segment which connects centers of the pair of magnet holding portions, a second line segment which connects a center of one of the pair of magnet holding portions and a center of said bridge portion, and a third line segment which connects a center of the other of the pair of magnet holding portion and the center of said bridge portion define an isosceles triangle, as viewed in said optical axis direction, wherein the first line segment constitutes a base of the isosceles triangle and the second and third line segments constitute two equal sides of the isosceles triangle.

It is desirable for an opening to be formed in the advancing/retracting member to allow the image-stabilizing insertable/removable optical element to enter the opening when the insertable/removable frame is in the removed position.

It is desirable for the bridge portion to include a pair of protruding walls which protrude in a direction parallel to the optical axis from the opposed inner walls, respectively, and a connecting wall which lies in a plane orthogonal to the optical axis and connects the pair of protruding walls.

It is desirable for the optical device to include at least one ball which is installed between the first orthogonal guide surface and the second orthogonal guide surface. The optical device can be a camera equipped with a retractable lens barrel containing the photographing optical system.

According to the present invention, since the bridge portion is formed on the anti-shake frame, which is provided with the clearance through-hole (in which at least part of the image-stabilizing insertable/removable optical element moves), so as to connect the opposed inner walls of the clearance through-hole at the open end thereof while being offset toward the opposite side of the anti-shake frame relative to the second orthogonal guide surface and overlap the clearance through-hole as viewed in the optical axis direction, the strength of the anti-shake frame can be increased without increasing the diameter thereof. Consequently, miniaturization of the optical device, which includes the anti-shake frame, the insertable/removable frame that is supported by the anti-shake frame thereon and the image-stabilizing insertable/removable optical element that is held by the insertable/removable frame at an end thereof, can be achieved.

The present disclosure relates to subject matter contained in Japanese Patent Applications Nos. 2011-42027 (filed on Feb. 28, 2011) and 2011-124167 (filed on Jun. 2, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

Figure 1:
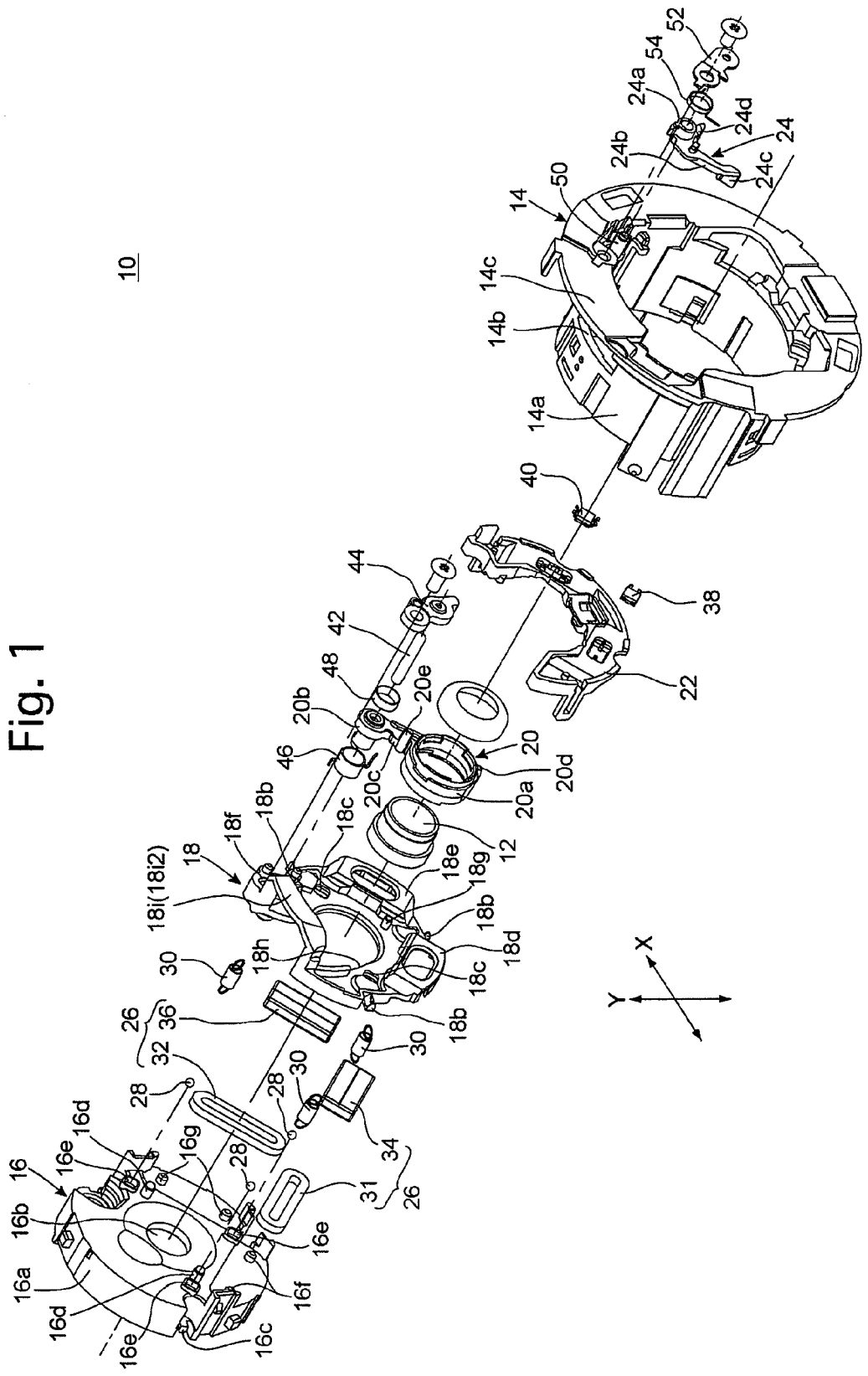
FIG. 1 is a rear exploded perspective view of an embodiment of an anti-shake lens unit according to the present invention that is designed for a lens shutter camera having a retractable photographic lens.
Figure 2:
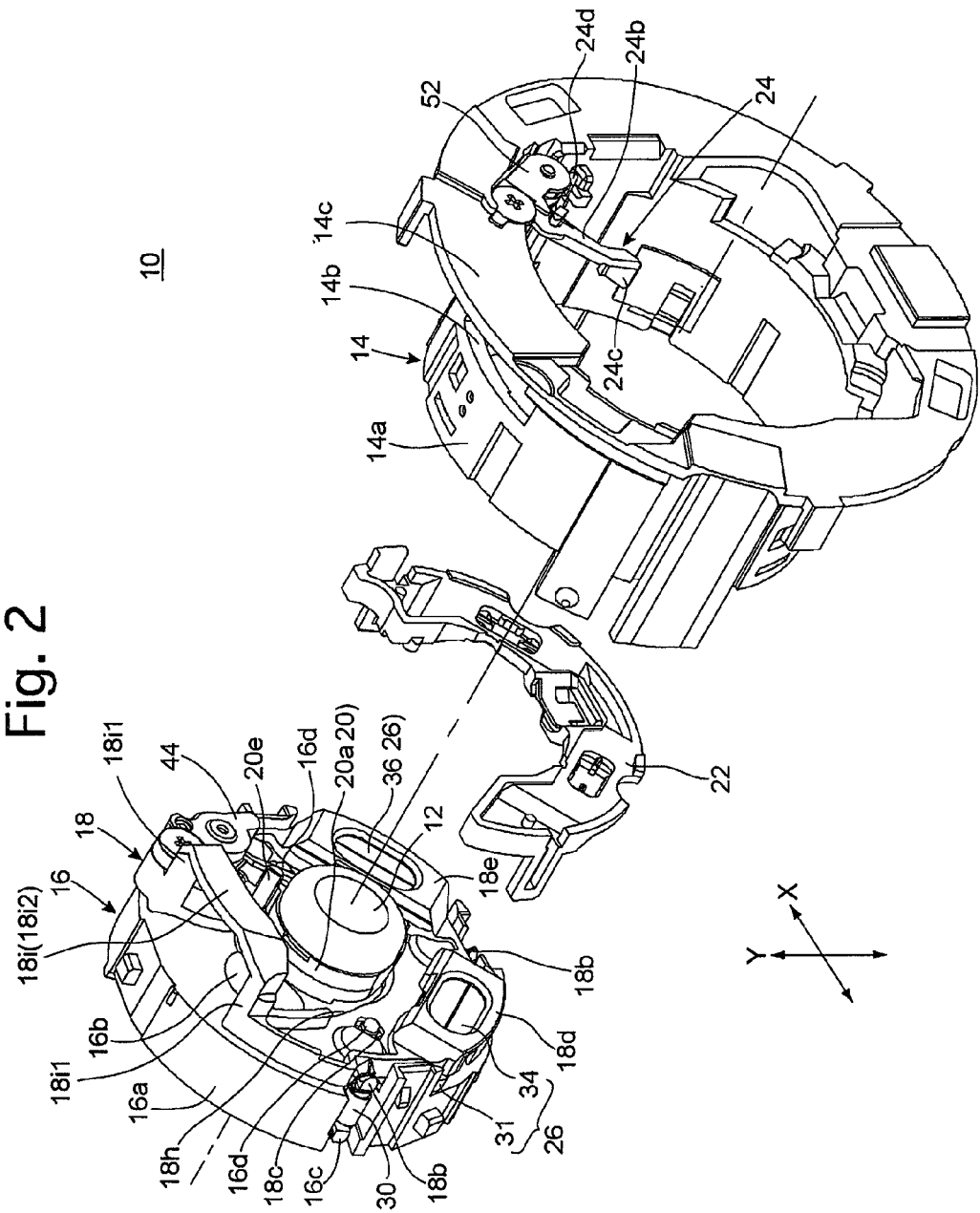
FIG. 2 is an exploded rear perspective view of the anti-shake lens unit with a sensor holder and a linear moving ring dismounted.
Figure 3:
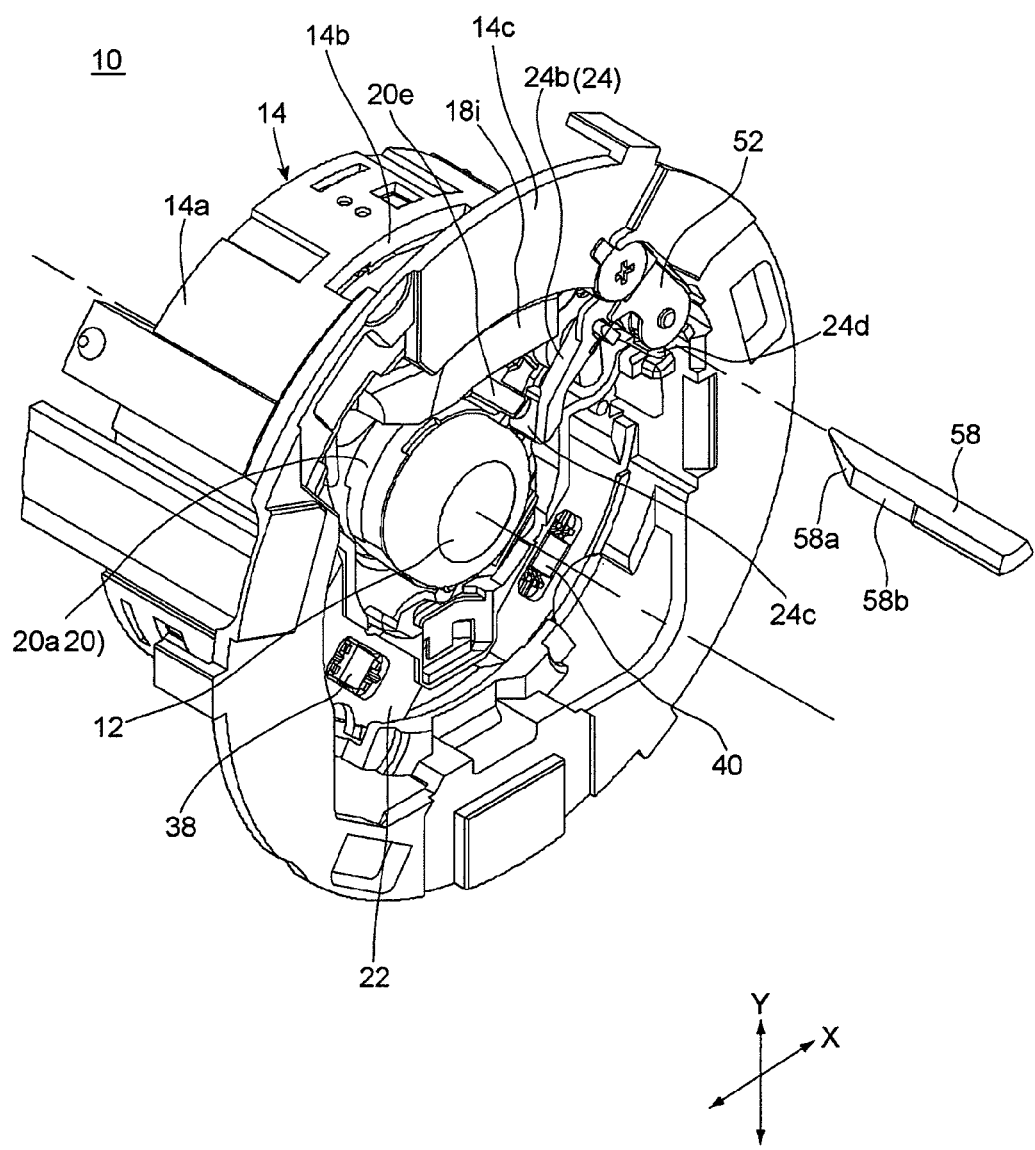
FIG. 3 is a rear perspective view of the anti-shake lens unit and a insertion/removal control-projection in the middle of the lens barrel retracting operation of the lens barrel.
Figure 4:
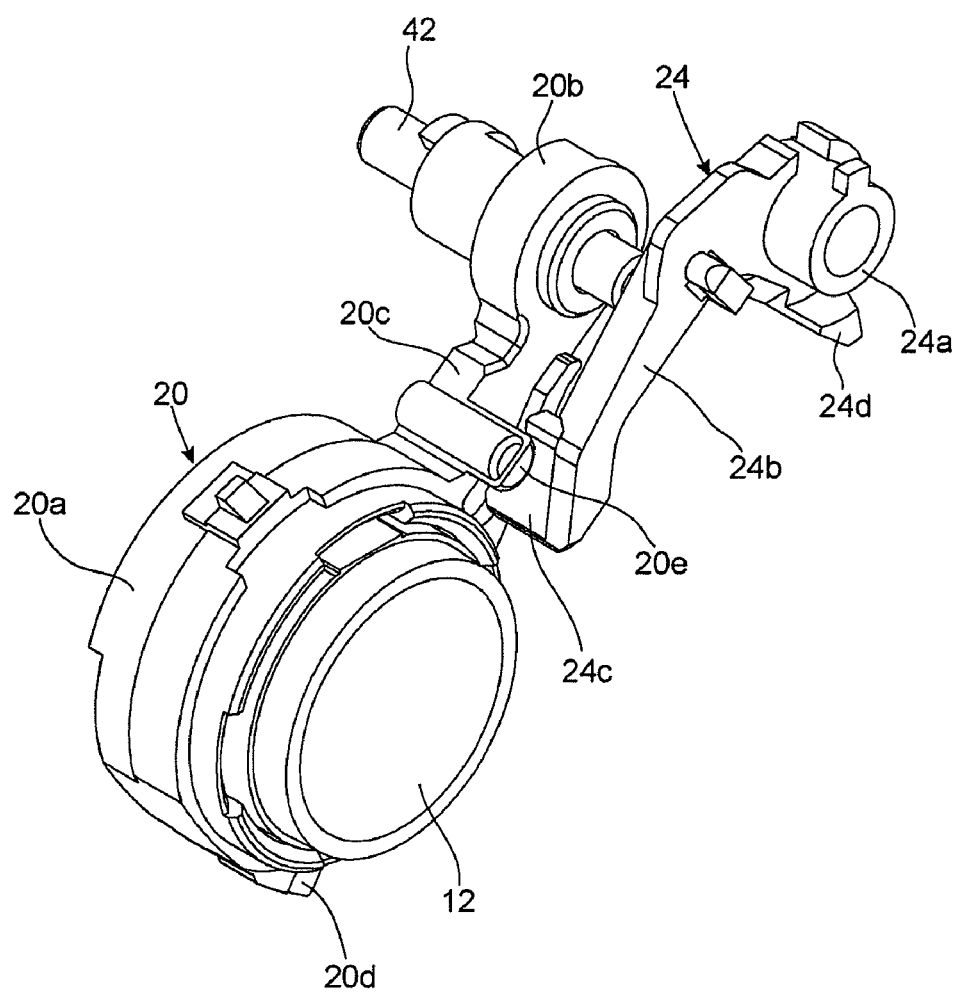
FIG. 4 is a rear perspective view of an insertable/removable frame and a removal drive lever, showing the positional relationship therebetween in a ready-to-photograph state of the lens barrel.
Figure 5:
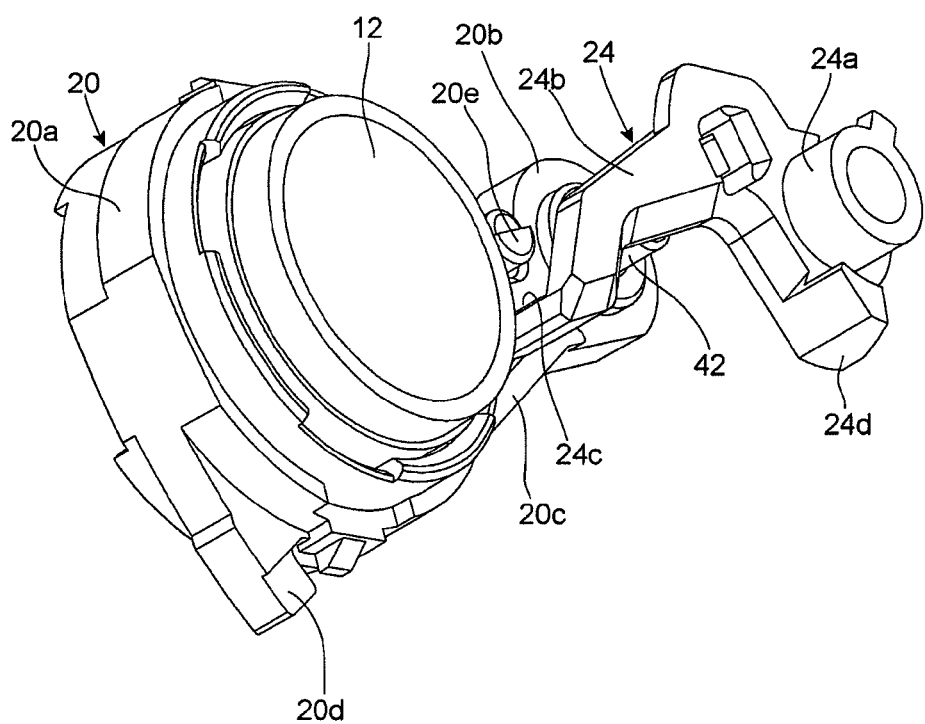
FIG. 5 is a rear perspective view of the insertable/removable frame and the removal drive lever in the ready-to-photograph state of the lens barrel, viewed from a different angle.

An anti-shake lens unit 10 shown in FIGS. 1 through 3 supports an insertable/removable image-stabilizing lens (insertable/removable image-stabilizing optical element) 12 which constitutes apart of a photographing optical system of a lens barrel of a camera. As shown in FIG. 1, the anti-shake lens unit 10 is provided with a linear moving ring (advancing/retracting member) 14, and is provided in the linear moving ring 14 with a shutter unit (advancing/retracting member) 16, an anti-shake frame 18, an insertable/removable frame 20, a sensor holder 22, a removal drive lever (removal drive mechanism/rotational relay member) 24 and an anti-shake drive actuator (anti-shake drive mechanism) 26.

Although the overall structure of the lens barrel in which the anti-shake lens unit 10 is incorporated is not shown in the drawings, the linear moving ring 14 is supported inside the lens barrel thereby in a manner to be linearly movable in a direction along a photographing optical axis O of the photographing optical system, and the linear moving ring 14 is moved toward an image plane from the object side when the lens barrel is brought into a lens barrel accommodated state (fully retracted state) from a ready-to-photograph state. In the following descriptions, the optical axis direction refers to a direction along or parallel to the photographing optical axis O, and the front and the rear refer to the front (object side) and the rear (image plane side) with respect to the optical axis direction. A known cam mechanism or the like can be adapted as a mechanism for moving the linear moving ring 14 in the optical axis direction.

The linear moving ring 14 is provided with a cylindrical portion 14a which surrounds the photographing optical axis O, and the shutter unit 16 is fixed to the inside of the cylindrical portion 14a. The shutter unit 16 is provided with a shutter housing 16a including a shutter (not shown) and has a photographing aperture 16b (see FIG. 1) which extends through a center of the shutter housing 16a in the optical axis direction. A shutter actuator provided in the shutter unit 16 drives the above-mentioned shutter to open and shut the photographing aperture 16b. The shutter housing 16a is provided, at three different circumferential positions on the outer periphery of the shutter housing 16a, with three spring hook projections 16c (only one of which is shown in FIGS. 1 and 2), respectively, and is provided on a rear surface thereof with two movement limit projections (movement limiter) 16d and three ball support holes 16e. The ball support holes 16e are bottomed holes (recesses) which are open toward the rear, and the bottom surfaces of the ball support holes 16e constitute orthogonal guide surfaces which are orthogonal to the photographing optical axis O (see FIG. 13).

Figure 13:
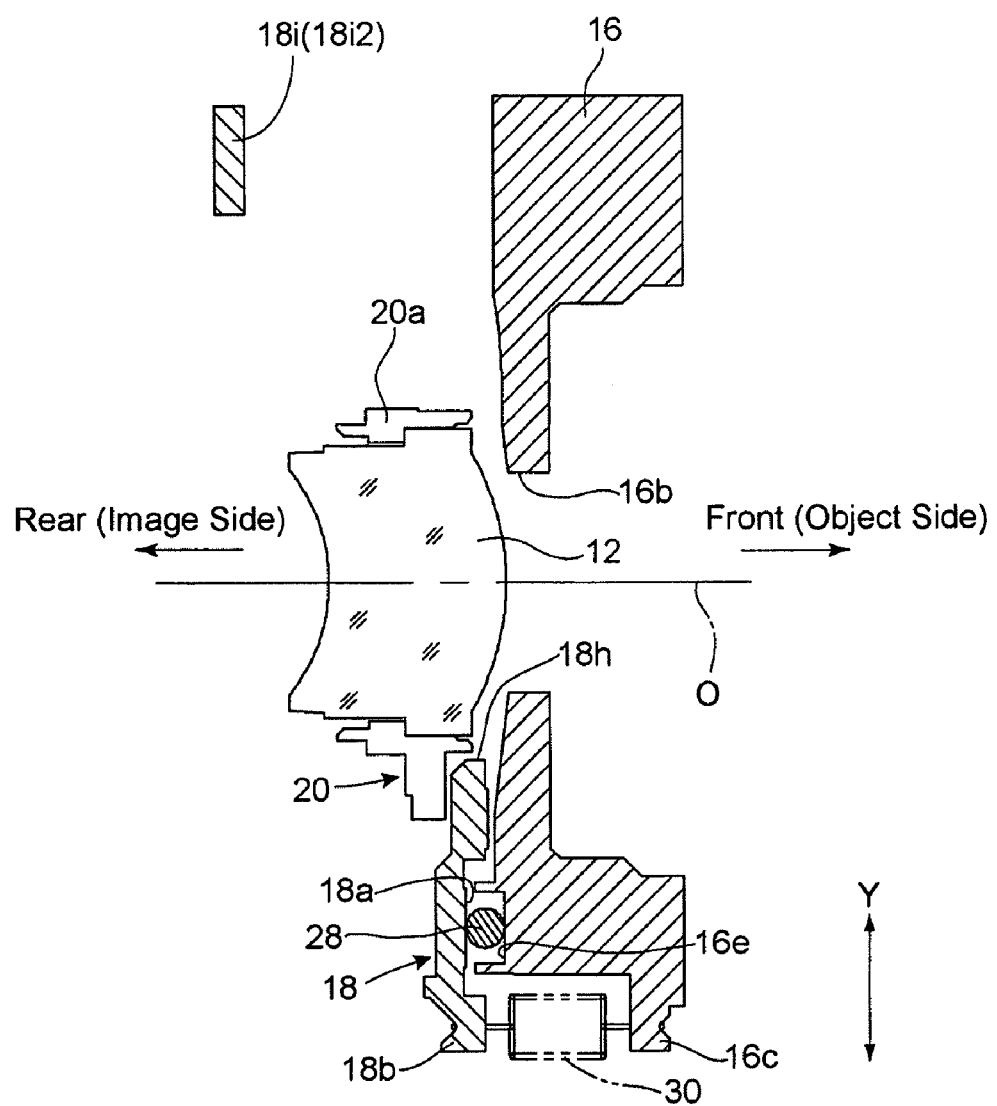
FIG. 13 is a sectional view taken along the line A-A shown in FIG. 12.

The anti-shake frame 18 is supported at the rear of the shutter unit 16. As shown in FIG. 13, three ball contact surfaces (orthogonal guide surfaces) 18a are formed on the front of the anti-shake frame 18 that faces the shutter unit 16, and three guide balls (anti-shake guide members) 28 are held between the three ball contact surfaces 18a and the bottoms of the three ball support holes 16e, respectively. As mentioned above, the shutter unit 16 is provided with the three ball support holes 16e, and the three ball contact surfaces 18a and the three guide balls 28 are provided to correspond to the three ball support holes 16e. The three ball contact surfaces 18a are flat surfaces (orthogonal guide surfaces) which lie in a plane substantially orthogonal to the photographing optical axis O, and hence, are parallel to and face the bottom surfaces of the three ball support holes 16e. The three guide balls 28 are loosely fitted in the three ball support holes 16e, respectively, so that there is a clearance between each guide ball 28 and the inner wall of the associated ball support hole 16e in directions substantially orthogonal to the photographing optical axis O. When positioned in the vicinity of the center of the associated support hole 16e, each guide ball 28 does not come in contact with the inner wall of the associated ball support hole 16e.

The anti-shake frame 18 is provided, at three different circumferential positions on the outer periphery thereof, with three spring hook projections 18b, respectively, and three extension springs (anti-shake frame biasing member/first biaser) 30 are extended and installed between the three spring hook projections 18b and the three spring hook projections 16c, respectively. The anti-shake frame 18 is biased in a direction to approach the shutter unit 16 (i.e., is biased forward) by the biasing force of the three extension springs 30 to make the three ball contact surfaces 18a press against the three guide balls 28, respectively, to thereby prevent the anti-shake frame 18 from moving forward. In this state, the three ball contact surfaces 18a are in point contact with the three guide balls 28, respectively, and the anti-shake frame 18 can freely move in directions orthogonal to the photographing optical axis O by making the three ball contact surfaces 18a slidingly contact the three guide balls 28 (or while making the three guide balls 28 roll when the three guide balls 28 are not in contact with the inner walls of the three ball support holes 16e, respectively).

The anti-shake frame 18 is further provided with two movement limit holes (movement limiter) 18c into which the two movement limit projections 16d of the shutter unit 16 are inserted, respectively. As shown in FIGS. 6 through 12, the inner wall of each movement limit hole 18c is rectangular, generally square in shape in a plane substantially orthogonal to the photographing optical axis O. In the following descriptions, the direction of one of the two diagonal lines across the inner wall of each movement limit hole 18c in a plane orthogonal to the photographing optical axis O refers to the X-axis direction and the direction of the other diagonal line refers to the Y-axis direction. The anti-shake frame 18 can freely move relative to the shutter unit 16 (the linear moving ring 14) in a plane orthogonal to the photographing optical axis O within a range until the movement limit projections 16d come into contact with the inner walls of the two movement limit holes 18c, respectively.

The anti-shake frame 18 is driven by the anti-shake drive actuator 26. The anti-shake drive actuator 26 is provided with two coils 31 and 32 which are supported by the shutter unit 16, and is further provided with two permanent magnets 34 and 36 which are supported by the anti-shake frame 18. The two permanent magnets 34 and 36 are fixed to two magnet holding portions 18d and 18e, respectively, which are provided on the anti-shake frame 18. The permanent magnets 34 and 36 are substantially identical in shape and size to each other. Each of the permanent magnets 34 and 36 is in the shape of a narrow, thin rectangular plate. The permanent magnets 34 and 36 are arranged symmetrically with respect to an imaginary plane P (see FIGS. 6 through 12) which lies on the photographing optical axis O and is extends in the Y-axis direction. More specifically, opposite sides of a magnetic pole boundary line M1 (see FIGS. 8 and 11) of the permanent magnet 34 which extends in the lengthwise direction thereof and passes through an approximate center of the permanent magnet 34 with respect to the width thereof are magnetized into north and south poles, respectively, while opposite sides of a magnetic pole boundary line M2 (see FIGS. 8 and 11) of the permanent magnet 36 which extends in the lengthwise direction thereof and passes through an approximate center of the permanent magnet 36 with respect to the width thereof are magnetized into north and south poles, respectively. In other words, each of the magnetic pole boundary lines M1 and M2 define a boundary between north and south poles of each of the permanent magnets 34 and 36, respectively. The magnetic pole boundary line M1 of the permanent magnet 34 and the magnetic pole boundary line M2 of the permanent magnet 36 are inclined to each other so that the distance therebetween (i.e., the distance from the imaginary plane P) increases in an increasingly upward direction (toward a removed position of the insertable/removable frame 20 which will be discussed later) from the bottom end in the Y-axis direction (from an insertion position side of the insertable/removable frame 20 which will be discussed later). The inclination angle of each magnetic pole boundary line M1 and M2 with respect to the imaginary plane P is set to approximately 45 degrees. Namely, the lengthwise directions (the magnetic pole boundary lines M1 and M2) of the permanent magnets 34 and 36 are substantially orthogonal to each other.

Figure 8:
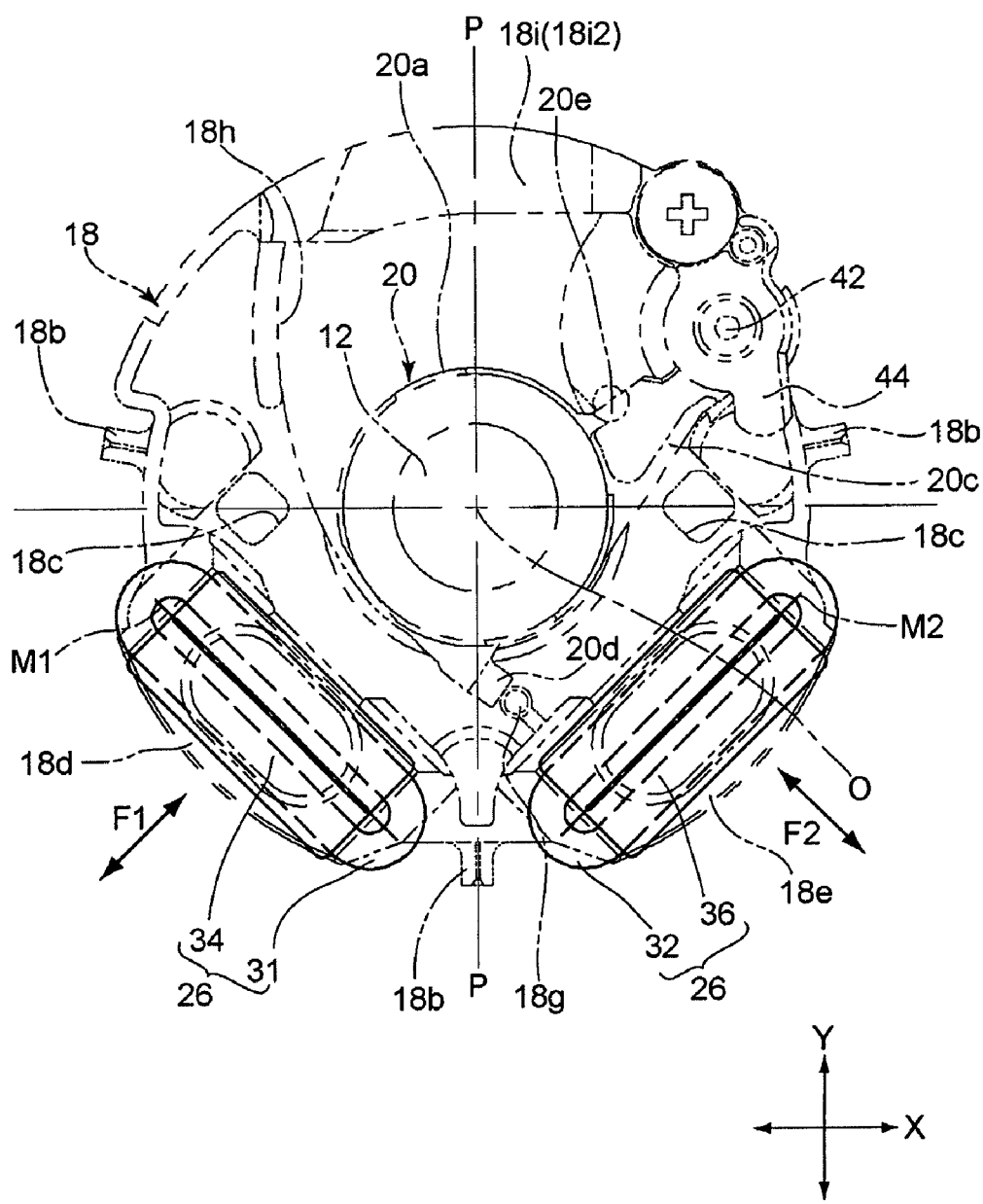
FIG. 8 is a diagram of the elements of an anti-shake drive actuator shown in FIG. 7 shown in a manner to emphasize these elements.
Figure 11:
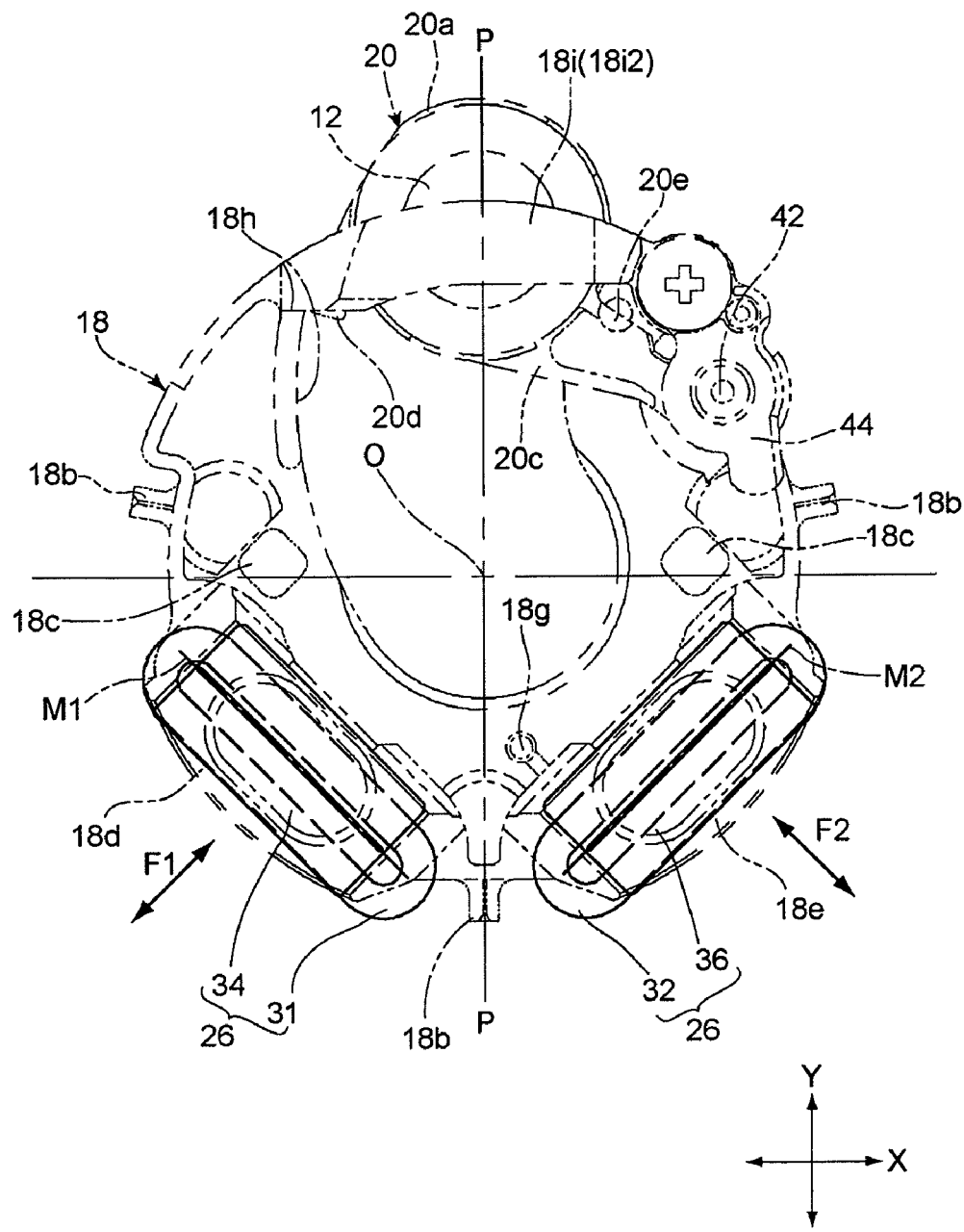
FIG. 11 is a diagram of the elements of the anti-shake drive actuator shown in FIG. 10 shown in a manner to emphasize these elements.
Figure 12:
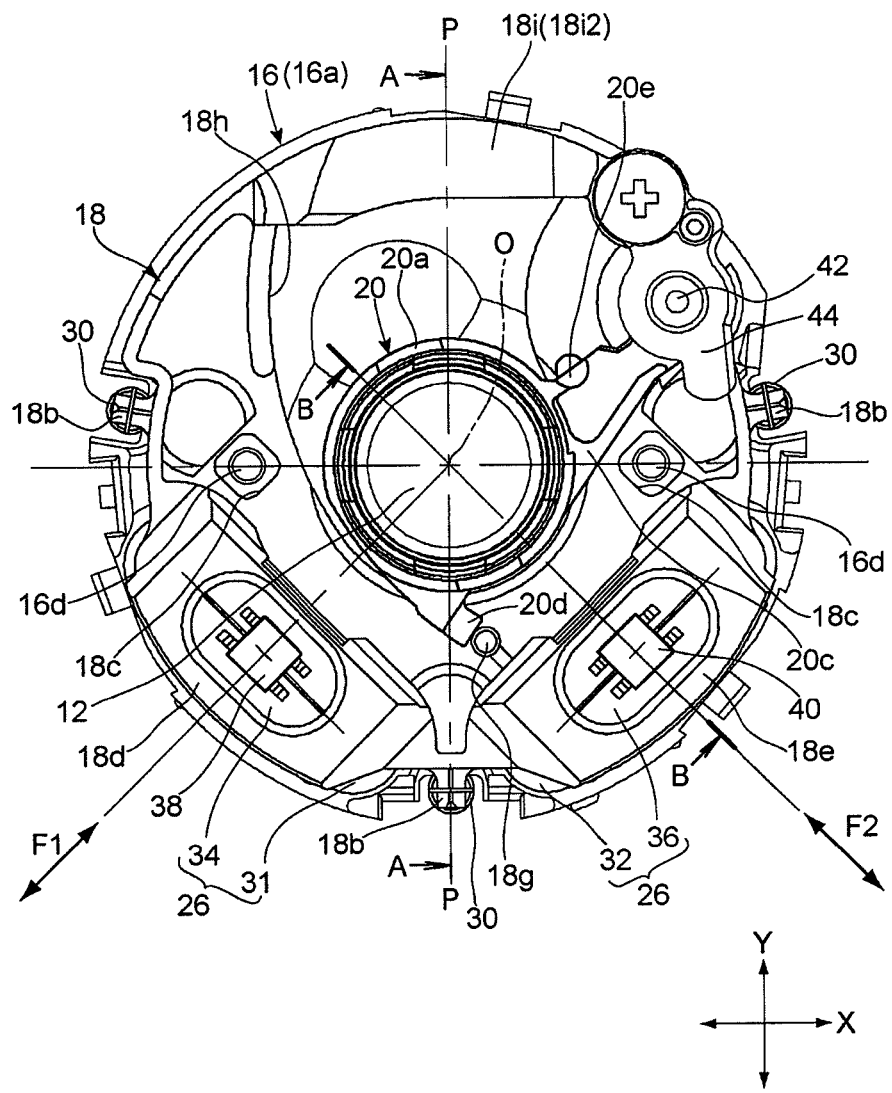
FIG. 12 is a rear elevational view of the anti-shake lens unit in the ready-to-photograph state with the linear moving ring and the sensor holder removed, viewed from the image plane side.

As shown in FIGS. 1, 8 and 11, each of the coils 31 and 32 is an air-core coil which includes a pair of elongated portions that are substantially parallel to each other and a pair of curved (U-shaped) portions which connect the pair of elongated portions at respective ends thereof. The coils 31 and 32 are substantially identical in shape and size to each other. The shutter housing 16a is provided on the rear thereof with a pair of positioning projections 16f and a pair of positioning projections 16g (see FIG. 1). The coil 31 is supported on the shutter unit 16 with the pair of positioning projections 16f engaged into the air-core portion of the coil 31, and the coil 32 is supported on the shutter unit 16 with the pair of positioning projections 16g engaged into the air-core portion of the coil 32. In this supporting state, the lengthwise direction of the coil 31 is substantially parallel to the magnetic pole boundary line M1 and the lengthwise direction of the coil 32 is substantially parallel to the magnetic pole boundary line M2. The coils 31 and 32 are connected to a flexible PWB (printed wiring board (not shown)) which extends from the shutter unit 16, and are further connected to a control circuit board of the camera, in which the present embodiment of the anti-shake lens unit 10 is incorporated, via another flexible PWB (not shown) provided inside the lens barrel. The control of power that is applied to the coils 31 and 32 is performed by a control circuit on the above-mentioned control circuit board.

Figure 14:
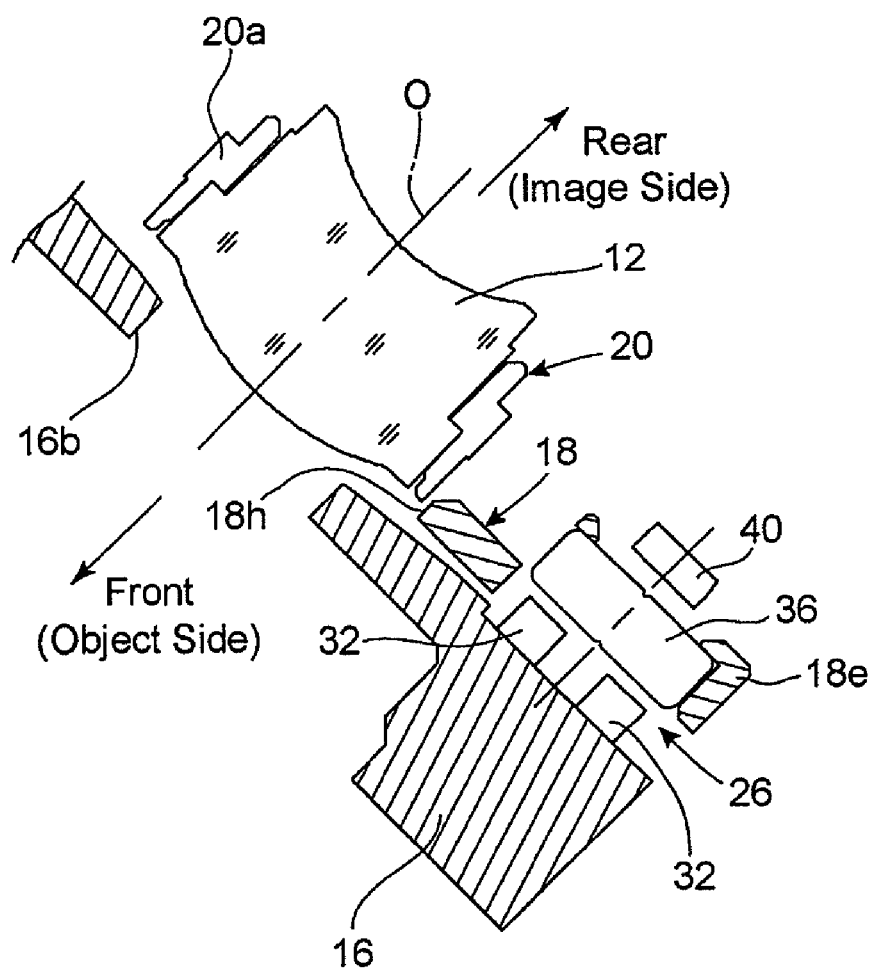
FIG. 14 is a sectional view taken along the line B-B shown in FIG. 12.

In the anti-shake drive actuator 26 that has the above described structure, the coil 31 and the permanent magnet 34 face each other in the optical axis direction, and a driving force is generated in a direction substantially orthogonal to the magnetic pole boundary line M1 of the permanent magnet 34 (i.e., orthogonal to the lengthwise direction of the coil 31) in a plane orthogonal to the optical axis O upon the coil 31 being energized. The direction of action of this driving force is shown by a double-headed arrow F1 in FIGS. 8, 11 and 12. In addition, the coil 32 and the permanent magnet 36 face each other in the optical axis direction as shown in FIG. 14, and a driving force is generated in a direction substantially orthogonal to the magnetic pole boundary line M2 of the permanent magnet 36 (i.e., orthogonal to the lengthwise direction of the coil 32) in a plane orthogonal to the optical axis O upon the coil 32 being energized. The direction of action of this driving force is shown by a double-headed arrow F2 in FIGS. 8, 11 and 12. The direction of action of each of the two aforementioned driving forces intersects both the X-axis direction and the Y-axis direction at an angle of approximately 45 degrees, so that the anti-shake frame 18 can be moved to any arbitrary position in a plane orthogonal to the photographing optical axis O by controlling the passage of current through each of the coils 31 and 32. As described above, the moving range of the anti-shake frame 18 is limited by engagement of the inner walls of the two movement limit holes 18*c* with the two movement limit projections 16*d*, respectively.

The sensor holder 22 is fixed to the rear of the anti-shake frame 18. The sensor holder 22 has a shape covering the rear sides of the two magnet holding portions 18*d* and 18*e* and supports two position detection sensors 38 and 40 that are respectively positioned behind the two permanent magnets 34 and 36. The position detection sensors 38 and 40 are connected to the aforementioned flexible PWB (not shown), which extends from the shutter unit 16, and are further connected to the aforementioned control circuit board of the camera, in which the present embodiment of the anti-shake lens unit 10 is incorporated, via the aforementioned other flexible PWB (not shown) provided inside the lens barrel. The drive position of the anti-shake frame 18 that is driven by the anti-shake drive actuator 26 can be detected via the position detection sensors 38 and 40.

The anti-shake lens unit 10 is provided with an insertable/removable frame 20 which is supported by the anti-shake frame 18 thereon to be rotatable (swingable) about a rotational shaft 42 that extends parallel to the photographing optical axis O. The front end of the rotational shaft 42 is fixedly fitted into a shaft support hole 18*f* formed in the anti-shake frame 18, and the rear end of the rotational shaft 42 is fixed to a retaining member 44 fixed to the anti-shake frame 18. The insertable/removable frame 20 is provided with a cylindrical lens holder portion 20*a*, a shaft bearing portion 20*b* and an arm portion 20*c*. The cylindrical lens holder portion 20*a* holds the insertable/removable image-stabilizing lens 12, the rotational shaft 42 is inserted into the shaft bearing portion 20*b*, and the cylindrical lens holder portion 20*a* and the shaft bearing portion 20*b* are connected via the arm portion 20*c*. The insertable/removable frame 20 is swingable (rotatable) about the rotational shaft 42 between the insertion position shown in FIGS. 2 through 8 and 12 and the removed position shown in FIGS. 9 through 11, and the insertion position is defined by engagement of a stopper contact portion 20*d* formed on the cylindrical lens holder portion 20*a* with a stopper 18*g* formed on the anti-shake frame 18. The insertable/removable frame 20 is biased toward the insertion position by an insertable/removable frame biasing spring (insertable/removable-frame biasing member/second biaser) 46. The insertable/removable frame biasing spring 46 is configured of a torsion coil spring, the ends of which are hooked onto the anti-shake frame 18 and the insertable/removable frame 20, respectively. In addition, an optical-axis-direction biasing spring 48 configured of a compression spring is installed between the shaft bearing portion 20*b* and the retaining member 44, and the insertable/removable frame 20 is biased forward by the optical-axis-direction biasing spring 48 so that the position of the insertable/removable frame 20 in the optical axis direction is stabilized.

When the insertable/removable frame 20 is in the insertion position, the insertable/removable image-stabilizing lens 12 is positioned on the photographing optical axis O. When the insertable/removable frame 20 rotates to the removed position in a state where the anti-shake frame 18 is at the movement limit thereof in the Y-axis direction (hereinafter referred to as the removal assisting position), in which the end of the inner wall of the movement limit holes 18*c* of the anti-shake frame 18 on the insertion position side (the lower end of the inner wall of each movement limit hole 18*c* with respect to FIGS. 6 through 12) comes into contact with the associated movement limit projection 16*d*, the center of the insertable/removable image-stabilizing lens 12 is displaced from the photographing optical axis O in the Y-axis direction. A clearance through-hole 18*h*, the shape of which corresponds to the path of movement of the cylindrical lens holder portion 20*a* that is defined by the arc-shaped path about the rotational shaft 42, is formed through the anti-shake frame 18 in the optical axis direction, and the outer end (the upper end with respect to FIGS. 6 through 12) of the clearance through-hole 18*h* is open (extends through) at a portion of the outer periphery of the anti-shake frame 18. The front end of the cylindrical lens holder portion 20*a* is positioned in the clearance through-hole 18*h* when the insertable/removable frame 20 is in the removed position. The shape and size of the clearance through-hole 18*h* as viewed in the optical axis direction can be such that the clearance through-hole 18*h* includes the circular-arc-shaped moving path of the cylindrical lens holder portion 20*a* about the rotational shaft 42 and that the inner end of the clearance through-hole 18*h* is closed and the outer end of the clearance through-hole 18*h* is open.

The anti-shake frame 18 is integrally provided with a bridge portion 18*i* which connects the opposed inner walls of the clearance through-hole 18*h*. The bridge portion 18*i* is provided with a pair of protruding walls 18*i*1 (see FIG. 2) and a connecting wall 18*i*2 (see FIGS. 2 and 8 through 13). The pair of protruding walls 18*i*1 protrude in a direction parallel to the optical axis O from the opposed inner walls of the clearance through-hole 18*h* of the anti-shake frame 18 at the open end of the clearance through-hole 18*h*, and the connecting wall 18*i*2 lies in a plane orthogonal to the optical axis O and connects the pair of protruding walls 18*i*1. The bridge portion 18*i* (specifically the connecting wall 18*i*2) is offset toward the opposite side of the anti-shake frame 18 relative to the three ball contact surfaces 18*a* (i.e., rearwardly in the optical axis direction) to be prevented from interfering with the cylindrical lens holder portion 20*a* (the insertable/removable image-stabilizing lens 12) when the insertable/removable frame 20 rotates to the removed position. The direction of projection of the bridge portion 18*i* is identical to both the direction of projection of the two magnet holding portions 18*d* and 18*e*, which respectively hold the permanent magnets 31 and 32, and the direction of projection of the rotational shaft 42 of the insertable/removable frame 20.

In addition, as shown specifically in FIGS. 6 through 12, as viewed in the optical axis direction, the bridge portion 18*i* and the pair of magnet holding portions 18*d* and 18*e* are arranged so that the following three line segments, i.e., a line segment which connects the centers of the pair of magnet holding portions 18*d* and 18*e*, a line segment which connects the center of the magnet holding portion 18*d* and the center of the bridge portion 18*i* and a line segment which connects the center of the magnet holding portion 18*e* and the center of the bridge portion 18*i* define an isosceles triangle with the line segment which connects the centers of the pair of magnet holding portions 18*d* and 18*e* constituting the base of the isosceles triangle and with the other two line segments constituting the two equal sides of the isosceles triangle. The arrangement in which the three rearwardly projecting portions (18*i*, 18*d* and 18*e*) are offset to the opposite side of the anti-shake frame 18 relative to the three ball contact surfaces 18*a* (i.e., rearwardly in the optical axis direction) achieves a good weight balance, thus making miniaturization of the anti-shake lens unit 10 possible.

Additionally, the cylindrical portion 14*a* of the linear moving ring 14 is provided with a radial cutout (opening) 14*b* (see FIGS. 1 through 3) which is formed to correspond to the bridge portion 18*i* of the anti-shake frame 18 so as to allow the cylindrical lens holder portion 20*a* (the insertable/removable image-stabilizing lens 12) which is accommodated in the bridge portion 18*i* by the movement of the insertable/removable frame 20 to the removed position to enter the radial cutout 14*b*, and a light shield wall 14*c* is formed on the linear moving ring 14 to be positioned behind the cutout 14*b*. The anti-shake frame 18 that includes the bridge portion 18*i* is formed into a circular outside shape as viewed in the optical axis direction so as to fit into the cylindrical portion 14*a* of the linear moving ring 14.

The removal drive lever 24 is positioned in the linear moving ring 14 and supported thereby to be rotatable (swingable) about a rotational shaft 50 that is parallel to the photographing optical axis O. The rotational shaft 50 is formed integral with the linear moving ring 14 so as to be positioned in the vicinity of the rotational shaft 42. The rotational shaft 50 is inserted into a shaft hole formed through a shaft bearing portion 24*a* of the removal drive lever 24. A retaining plate 52 is fixed to the rear of the linear moving ring 14 to prevent the removal drive lever 24 from moving rearward. The removal drive lever 24 is provided with an arm portion 24*b* which extends radially from the shaft bearing portion 24*a* and is further provided in the vicinity of the free end of the arm portion 24*b* with a removal pressing portion 24*c* that is capable of coming into contact with a pressing-force receiving part 20*e* formed on the arm portion 20*c* of the insertable/removable frame 20.

Figure 6:
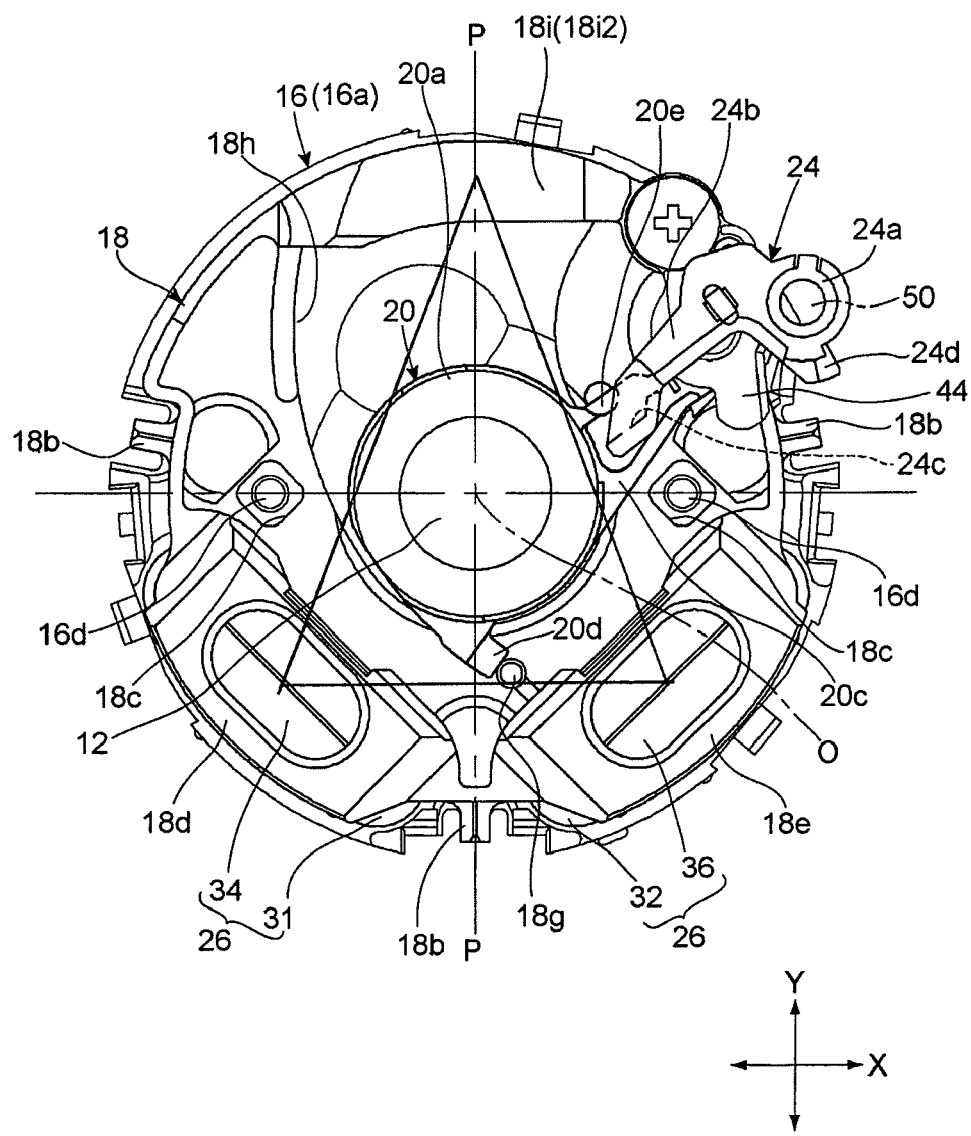
FIG. 6 is a rear elevational view of part of the anti-shake lens unit in the ready-to-photograph state of the lens barrel, viewed from the image plane side.
Figure 7:
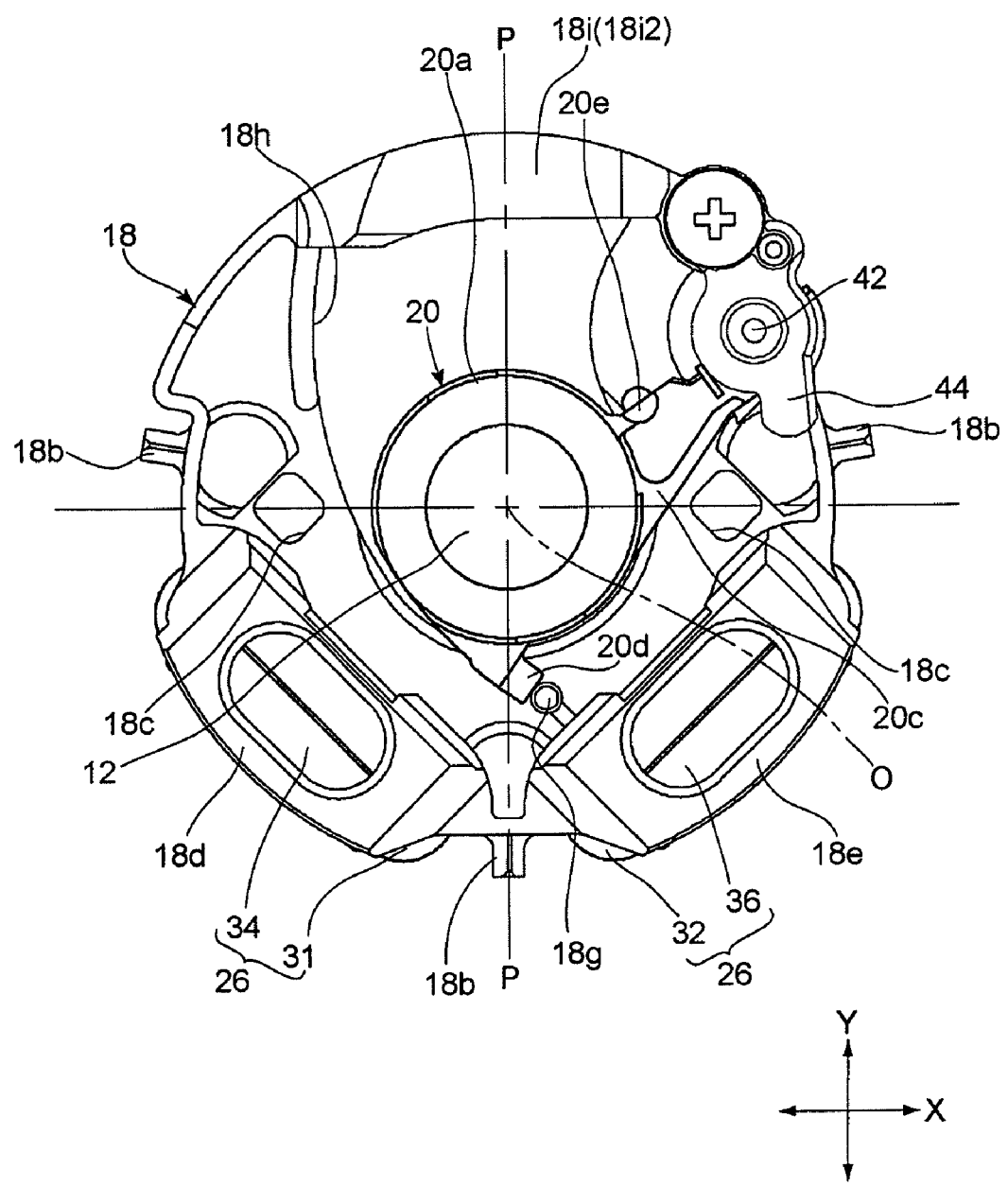
FIG. 7 is a rear elevational view that shows elements of the anti-shake lens unit shown in FIG. 6 which are driven during an image-stabilizing operation and coils shown in FIG. 6.

The biasing force of the insertable/removable frame biasing spring 46 urges the insertable/removable frame 20 to rotate toward the insertion position from the removed position (counterclockwise direction with respect to FIGS. 6 through 12), and the removal drive lever 24 is also biased to rotate in the same direction (counterclockwise direction with respect to FIGS. 6 through 12) by a removal drive lever biasing spring 54. A stopper (not shown) which determines the rotation limit of the removal drive lever 24 in the biasing direction of the removal drive lever biasing spring 54 is formed on the inside of the linear moving ring 14. On the other hand, rotation of the insertable/removable frame 20 in the biasing direction of the insertable/removable frame biasing spring 46 is limited by engagement between the stopper contact portion 20*d* and the stopper 18*g*. FIG. 6 shows a state where the insertable/removable frame 20 and the removal drive lever 24 are in contact with the stopper 18*g* and the aforementioned stopper (not shown) of the linear moving ring 14, respectively, and at this stage the pressing-force receiving part 20*e* and the removal pressing portion 24*c* are spaced from each other (see FIGS. 4 and 5). The clearance between the pressing-force receiving part 20*e* and the removal pressing portion 24*c* is determined to be such a degree as to prevent the pressing-force receiving part 20*e* from coming in contact with the removal pressing portion 24*c* in the moving range of the anti-shake frame 18 relative to the shutter unit 16 (i.e., the aforementioned range until the movement limit projections 16*d* come into contact with the inner walls of the two movement limit holes 18*c*, respectively). In other words, the anti-shake lens unit 10 is configured so that the removal drive lever 24 does not interfere with either of the anti-shake driving operations of the anti-shake frame 18 and the insertable/removable frame 20 that are performed by the anti-shake drive actuator 26. If no external force is exerted on the insertable/removable frame 20 and the removal drive lever 24, the state shown in FIGS. 6 through 8, in which the insertable/removable frame 20 is held in the insertion position by the biasing force of the insertable/removable frame biasing spring 46, is maintained.

The removal drive lever 24 is provided in the vicinity of the shaft bearing portion 24*a* with a pressing-force receiving part 24*d*. A insertion/removal control-projection (removal drive mechanism/pressing member) 58 (see FIG. 3) is a stationary member which is fixed to the inside of the lens barrel to be positioned behind the removal drive lever 24. Rearward movement of the linear moving ring 14 when the lens barrel moves from a ready-to-photograph state to the lens barrel accommodated state causes the insertion/removal control-projection 58 to come into contact with and press the pressing-force receiving part 24*d* to rotate the removal drive lever 24 in a direction toward the removed position of the insertable/removable frame 20 from the insertion position of the insertable/removable frame 20. More specifically, the insertion/removal control-projection 58 is provided at the front end thereof with an end-face cam 58*a*, and retracting movement of the linear moving ring 14 toward the insertion/removal control-projection 58 causes the pressing-force receiving part 24*d* to come into contact with the end-face cam 58*a*. Subsequently, a further retracting movement of the linear moving ring 14 with the pressing-force receiving part 24*d* remaining in contact with the end-face cam 58*a* causes a component force which makes the removal drive lever 24 rotate in a direction against the biasing force of the removal drive lever biasing spring 54 (in a direction toward the removed position of the insertable/removable frame 20) created from the rearward moving force of the linear moving ring 14 in the optical axis direction, so that the removal drive lever 24 solely rotates by an amount of rotation corresponding to the aforementioned clearance, which causes the removal pressing portion 24*c* to come into contact with the pressing-force receiving part 20*e* of the insertable/removable frame 20. Thereupon, the pressing force in the direction toward the removed position of the insertable/removable frame 20 is transmitted to the insertable/removable frame 20 via the removal pressing portion 24*c* and the pressing-force receiving part 20*e*, which causes the removal drive lever 24 to press and rotate the insertable/removable frame 20 toward the removed position against the biasing forces of both the insertable/removable frame biasing spring 46 and the removal drive lever biasing spring 54. After the insertable/removable frame 20 reaches the removed position, a removed-lens holding surface 58*b* which is formed on a side of the insertion/removal control-projection 58 to extend substantially parallel to the optical axis O is engaged with a side of the pressing-force receiving part 24d, so that the insertable/removable frame 20 is held in the removed position (see FIG. 9). At this time, the cylindrical lens holder portion 20a (the insertable/removable image-stabilizing lens 12) of the insertable/removable frame 20 partly projects radially outwards from the outer end of the clearance through-hole 18h of the anti-shake frame 18, and overlaps the bridge portion 18i as viewed in the optical axis direction. The cylindrical lens holder portion 20a (the insertable/removable image-stabilizing lens 12) of the insertable/removable frame 20 enters the space defined by the connecting wall 18i2 and the pair of protruding walls 18i1 of the bridge portion 18i and the cutout 14b (see FIGS. 1 through 3) that is formed in the linear moving ring 14.

Operations of the anti-shake lens unit 10 that has the above described structure will be discussed hereinafter. In a ready-to-photograph state shown in FIGS. 6 through 8, the insertable/removable frame 20 is held at the insertion position by the biasing force of the insertable/removable frame biasing spring 46, and the center (optical axis) of the insertable/removable image-stabilizing lens 12 is coincident with the photographing optical axis O. In this ready-to-photograph state, deviations (image shake) of an object image focused on an image plane can be reduced by driving the insertable/removable image-stabilizing lens 12 in directions orthogonal to the photographing optical axis O by the anti-shake drive actuator 26 in accordance with the direction and magnitude of vibrations applied to the lens barrel (i.e. to the photographing optical system). More specifically, the angular velocities of the lens barrel are detected by gyro sensors, and are time-integrated to determine a moving angle, and subsequently, from this moving angle, the moving amounts of the image on the focal plane in the X-axis direction and in the Y-axis direction are calculated while the driving amounts and the driving directions of the insertable/removable image-stabilizing lens 12 (the anti-shake frame 18) for the respective axial directions are calculated in order to cancel out the image shake. Subsequently, the passage of current through each of the coils 31 and 32 is controlled in accordance with these calculated values. Thereupon, the anti-shake frame 18 is moved while being supported by the three guide balls 28 at the three ball contact surfaces 18a. When the anti-shake frame 18 is driven to perform an anti-shake driving operation, the insertable/removable frame 20 is held in the insertion position, in which the stopper contact portion 20d is made to contact the stopper 18g, so that the anti-shake frame 18 and the insertable/removable frame 20 (the insertable/removable image-stabilizing lens 12) integrally move.

In a ready-to-photograph state, it is possible to calibrate the position detection sensors 38 and 40 by utilizing information on the positions of movement limits of the anti-shake frame 18, where each of the two movement limit projections 16d comes into contact with the inner wall of the associated movement limit hole 18c of the anti-shake frame 18. The direction of action of each of the two driving forces F1 and F2, which are respectively generated by a combination of the coil 31 and the permanent magnet 34 and a combination of the coil 32 and the permanent magnet 36, intersects both the X-axis direction and the Y-axis direction at an angle of approximately 45 degrees. Accordingly, the movement limits of each movement limit hole 18c in the X-axis direction relative to the associated movement limit projection 16d (defined by the each laterally opposed corner (end) of each movement limit hole 18c coming into contact with the associated movement limit projection 16d) can be used as reference positions for driving the anti-shake frame 18 in the X-axis direction by the anti-shake drive actuator 26, and the movement limits of each movement limit hole 18c in the Y-axis direction relative to the associated movement limit projection 16d (defined by each vertically opposed corner (end) of each movement limit hole 18c coming into contact with the associated movement limit projection 16d) can be used as reference positions for driving the anti-shake frame 18 in the Y-axis direction by the anti-shake drive actuator 26. A practical anti-shake driving range of the anti-shake frame 18 in a ready-to-photograph state is defined within a range in which each movement limit projection 16d does not come into contact with the inner wall of the associated movement limit hole 18c.

When the lens barrel moves from a ready-to-photograph state to the lens barrel accommodated state, the anti-shake lens unit 10 (the linear moving ring 14) is moved rearward in the optical axis direction by a motor (not shown) for driving the whole lens barrel forward and rearward, and the pressing-force receiving part 24d of the removal drive lever 24 which retracts with the linear moving ring 14 comes in contact with the end-face cam 58a of the insertion/removal control-projection 58. A further rearward movement of the linear moving ring 14 causes the pressing-force receiving part 24d to be pressed by the end-face cam 58a. Thereupon, a component force is produced from the retracting force of the linear moving ring 14, so that the removal drive lever 24 is rotated against the biasing force of the removal drive lever biasing spring 54 to thereby cause the removal pressing portion 24c to come into contact with the pressing-force receiving part 20e. The insertable/removable frame 20 is acted upon by a biasing force of the insertable/removable frame biasing spring 46 toward the insertion position as described above, and the removal drive lever 24 with the removal pressing portion 24c in contact with the pressing-force receiving part 20e presses the insertable/removable frame 20 toward the removed position from the insertion position against the biasing force of the insertable/removable frame biasing spring 46. In addition, the anti-shake frame 18, which supports the insertable/removable frame 20, is acted upon by the biasing force of the three extension springs 30 in a direction to press the three ball contact surfaces 18a against the three guide balls 28. Namely, the insertable/removable frame biasing spring 46 and the extension spring 30 exert spring resistance on movements of the insertable/removable frame 20 and the anti-shake frame 18, respectively. Here the rotational resistance of the insertable/removable frame 20 that is caused by the insertable/removable frame biasing spring 46 is predetermined to be greater than the resistance to movement of the anti-shake frame 18 that is caused by the extension spring 30. Therefore, the pressing force acting on the insertable/removable frame 20 is transmitted to the anti-shake frame 18, thus causing the anti-shake frame 18 to move with the insertable/removable frame 20 toward the removed position before the commencement of rotation of the insertable/removable frame 20 toward the removed position. Subsequently, the anti-shake frame 18 is moved to the removal assisting position (shown in FIGS. 9 through 11), in which the end of the inner wall of each of the two movement limit holes 18c of the anti-shake frame 18 on the insertion position side in the Y-axis direction comes into contact with the associated movement limit projection 16d. Since the aforementioned practical anti-shake driving range of the anti-shake frame 18 in a ready-to-photograph state includes no points where the inner wall of each movement limit hole 18c comes into contact with the associated movement limit projection 16d as described above, the removal assisting position is positioned outside the anti-shake driving range. Immediately after the anti-shake frame 18 is prevented from moving beyond the removal assisting position after reaching the removal assisting position, the insertable/removable frame 20 is solely rotated from the insertion position to the removed position. Accordingly, the movement of the insertable/removable image-stabilizing lens 12 to the removed position thereof (shown in FIGS. 9 through 11) is performed as the result of a combination of the movement of the anti-shake frame 18 to the removal assisting position in the Y-axis direction and the rotation of the insertable/removable frame 20 to the removed position.

Figure 9:
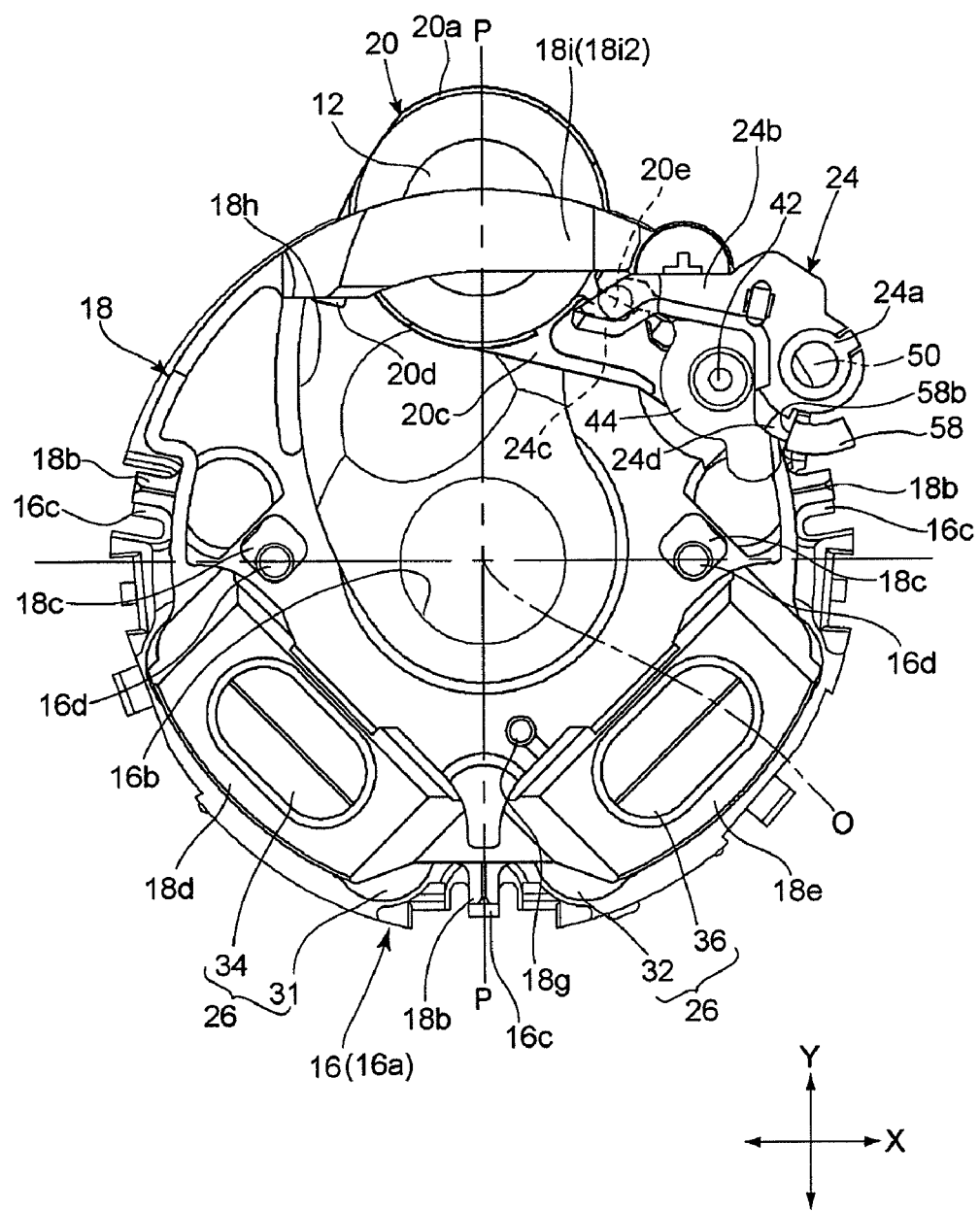
FIG. 9 is a rear elevational view of the portion of the anti-shake lens unit shown in FIG. 6 in a lens barrel accommodated state (fully-retracted state) of the lens barrel.
Figure 10:
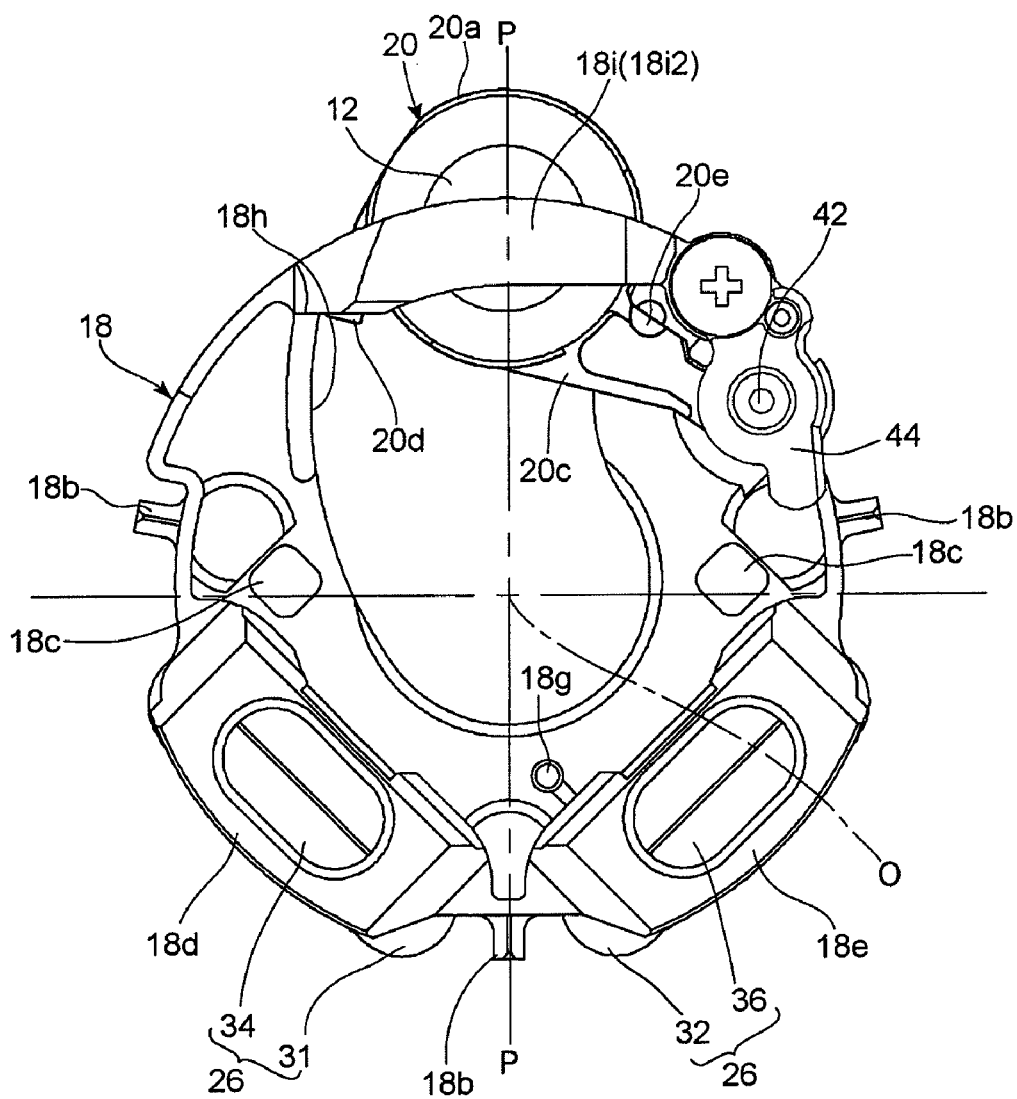
FIG. 10 is a rear elevational view of elements of the anti-shake lens unit shown in FIG. 9 which are driven during an image-stabilizing operation and the coils shown in FIG. 9.
Figure 10:
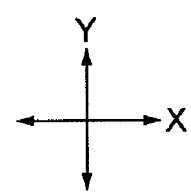

The insertable/removable image-stabilizing lens 12 is removed from a position on an optical path (the photographing optical axis O) as shown in FIGS. 9 through 11 due to the movement of the anti-shake frame 18 to the removal assisting position and the rotation of the insertable/removable frame 20 to the removed position. A further rearward movement of the linear moving ring 14 causes the removed-lens holding surface 58b of the insertion/removal control-projection 58 to come in contact with the pressing-force receiving part 24d of the removal drive lever 24 (see FIG. 9), so that the insertable/removable frame 20 together with the removal drive lever 24 is held in the removed position by the insertion/removal control-projection 58 and is prevented from rotating toward the insertion position. Although not shown in the drawings, upon the lens barrel reaching the lens barrel accommodated state, a member positioned behind the insertable/removable image-stabilizing lens 12 (e.g., an optical element other than the insertable/removable image-stabilizing lens 12 which is positioned behind the insertable/removable image-stabilizing lens 12 in a ready-to-photograph state) enters an open space created by a removal of the insertable/removable image-stabilizing lens 12 (the cylindrical lens holder portion 20a). This structure makes it possible to reduce the length of the lens barrel in the optical axis direction in the lens barrel accommodated state of the lens barrel to a smaller degree than a type of lens barrel in which a plurality of optical elements are retracted and accommodated in line along the optical axis thereof.

Conversely, when the lens barrel moves from the lens barrel accommodated state to a ready-to-photograph state, the linear moving ring 14 is moved forward to thereby release the pressing force of the insertion/removal control-projection 58 against the removal drive lever 24, which causes the removal drive lever 24 to return to the position shown in FIG. 6 by the biasing force of the insertable/removable frame biasing spring 46. Thereupon, the biasing force of the insertable/removable frame biasing spring 46 causes the insertable/removable frame 20 to rotate from the removed position to the insertion position. In association with this rotation, the holding of the anti-shake frame 18 in the removal assisting position is also released, which brings the anti-shake frame 18 into a state where it can be driven by the anti-shake drive actuator 26. Thereafter, upon the lens barrel moving to a ready-to-photograph state, the aforementioned calibration operation for the position detection sensors 38 and 40 is performed.

In the above-described anti-shake lens unit 10, when the insertable/removable frame 20 is rotated from the insertion position to the removed position, the anti-shake frame 18 that supports the insertable/removable frame 20 is also moved to the removal assisting position, and accordingly, the amount of movement of the insertable/removable image-stabilizing lens 12 from the position on the photographing optical axis O to the removed position in the Y-axis direction is equal to a combination of a rotation of the insertable/removable frame 20 and a movement of the anti-shake frame 18, which makes it possible to remove the insertable/removable image-stabilizing lens 12 to the removed position by a greater amount than the case where only the insertable/removable frame 20 rotates. In other words, the swinging radius of the insertable/removable frame 20 can be made small with respect to the amount of movement of the insertable/removable image-stabilizing lens 12 from the position on the photographing optical axis O to the removed position, which makes it possible to achieve miniaturization of the removal drive mechanism.

In addition, in the lens barrel accommodated state of the lens barrel, the anti-shake frame 18 can be prevented from rattling because the insertable/removable frame 20 (the removal drive lever 24) applies a pressing force onto the anti-shake frame 18 with one end of the inner wall of each movement limit hole 18c of the anti-shake frame 18 in the Y-axis direction being in contact with the associated movement limit projection 16d.

Additionally, since the removal assisting position is set outside the practical anti-shake driving range of the anti-shake frame 18 in a ready-to-photograph state, even if a severe impact is applied to the lens barrel in the lens barrel accommodated state to thereby cause the guide balls 28 to dent the three ball contact surfaces 18a, the influence of the dents can be prevented from being exerted on the anti-shake drive performance in a ready-to-photograph state of the lens barrel.

Nevertheless, the present invention can also be applied to a different embodiment in which the removal assisting position is not set for the anti-shake frame 18. In addition, although the end-face cam 58a of the insertion/removal control-projection 58 and the removal drive lever 24 press the removal drive lever 24 and the pressing-force receiving part 20e of the insertable/removable frame 20, respectively, in the above described embodiment, the present invention can also be applied to a structure in which the insertion/removal control-projection 58 presses the pressing-force receiving part 20e.

Although it is the shutter unit 16 that supports the anti-shake frame 18 in a manner to be movable in directions orthogonal to the optical axis direction in the above illustrated embodiment, the support member for the anti-shake frame can be any other member. For instance, the anti-shake frame 18 can be movably supported by a flange formed integral with the inside of the linear moving ring 14.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An optical device having an image-stabilizing insertable/removable optical element, comprising:
   an advancing/retracting member which is movable in an optical axis direction of a photographing optical system including said image-stabilizing insertable/removable optical element and includes a first orthogonal guide surface which is orthogonal to said optical axis, wherein said advancing/retracting member is moved in said optical axis direction between a ready-to-photograph position and an accommodated position, in which no pictures are taken;
   an anti-shake frame including a second orthogonal guide surface, which is parallel to and faces said first orthogonal guide surface, said anti-shake frame being supported by said advancing/retracting member to be movable along both said first orthogonal guide surface and said second orthogonal guide surface;
   an insertable/removable frame which holds said image-stabilizing insertable/removable optical element and is supported by said anti-shake frame to be rotatable between an insertion position in which said image-stabilizing insertable/removable optical element is positioned on said optical axis and a removed position in which said image-stabilizing insertable/removable optical element is removed from said optical axis;

a clearance through-hole formed through said anti-shake frame so as to allow said insertable/removable frame to move between said insertion position and said removed position with at least part of said image-stabilizing insertable/removable optical element positioned in said clearance through-hole, wherein said clearance through-hole includes a circular arc groove about a rotational center of said insertable/removable frame and wherein an outer end of said clearance through-hole is formed as an open end; and a bridge portion formed on said anti-shake frame to connect opposed inner walls of said clearance through-hole, wherein said bridge portion is offset toward the opposite side of said anti-shake frame relative to said second orthogonal guide surface and overlaps said clearance through-hole, as viewed in said optical axis direction.

2. The optical device according to claim 1, wherein, when said insertable/removable frame is in said removed position, said image-stabilizing insertable/removable optical element is partly positioned outside of said outer end of said clearance through-hole and overlaps said bridge portion, as viewed in said optical axis direction.

3. The optical device according to claim 1, further comprising a pair of magnets and a pair of coils which drive said anti-shake frame to perform an image-stabilizing operation and are supported by said anti-shake frame and said advancing/retracting member, respectively, wherein said anti-shake frame comprises:
a pair of magnet holding portions which support and hold said pair of magnets, respectively; and a rotational shaft which supports said insertable/removable frame in a manner to allow said insertable/removable frame to rotate about said rotational shaft, and wherein said pair of magnet holding portions and said rotational shaft project on the same side of said anti-shake frame as said bridge portion.

4. The optical device according to claim 3, wherein said bridge portion and said pair of magnet holding portions are arranged so that a first line segment which connects centers of said pair of magnet holding portions, a second line segment which connects a center of one of said pair of magnet holding portions and a center of said bridge portion, and a third line segment which connects a center of the other of said pair of magnet holding portion and said center of said bridge portion define an isosceles triangle, as viewed in said optical axis direction, wherein said first line segment constitutes a base of said isosceles triangle and wherein said second and third line segments constitute two equal sides of said isosceles triangle.

5. The optical device according to claim 1, wherein an opening is formed in said advancing/retracting member to allow said image-stabilizing insertable/removable optical element to enter said opening when said insertable/removable frame is in said removed position.

6. The optical device according to claim 1, wherein said bridge portion comprises:
a pair of protruding walls which protrude in a direction parallel to said optical axis from said opposed inner walls, respectively; and
a connecting wall which lies in a plane orthogonal to said optical axis and connects said pair of protruding walls.

7. The optical device according to claim 1, further comprising at least one ball which is installed between said first orthogonal guide surface and said second orthogonal guide surface.

8. The optical device according to claim 1, wherein said optical device comprises a camera equipped with a retractable lens barrel containing said photographing optical system.

* * * * *